Oct. 27, 1942.  E. L. SCHUMACHER  2,300,318
OPHTHALMIC MOUNTING
Filed Nov. 30, 1939
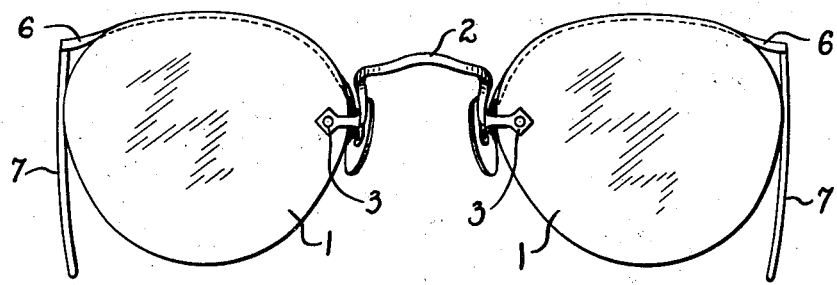
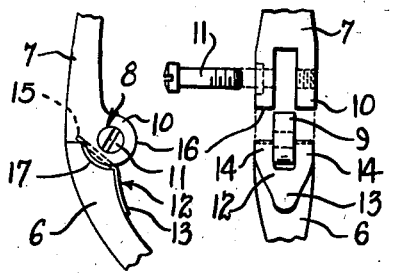
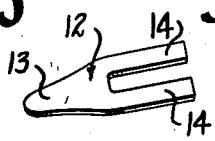
INVENTOR.
ELMER L. SCHUMACHER
BY Harry H. Styll
ATTORNEY.

Patented Oct. 27, 1942

2,300,318

UNITED STATES PATENT OFFICE 2,300,318

OPHTHALMIC MOUNTING

Elmer L. Schumacher, Southbridge, Mass., assignor to American Optical Company, Southbridge, Mass., a voluntary association of Massachusetts Application November 30, 1939, Serial No. 306,915

6 Claims. (Cl. 88—53)

This invention relates to improvements in ophthalmic mountings and has particular reference to an improved construction of pivot or hinge connection by which the temple members are connected to the temple supports of the mounting and method of making the same.

One of the principal objects of the invention is to provide such a construction of hinge or pivot connection for the temple members of an ophthalmic mounting as will maintain the friction thereof more nearly constant throughout the life of the mounting and novel method of making the same.

Another object is to provide novel means and methods of compensating for looseness resulting from wear of the parts of the pivotal connection of a temple to the supporting structure of an ophthalmic mounting whereby constant friction will be maintained at said connection so as to eliminate looseness and play.

Another object is to provide novel means and method of eliminating looseness and play in the temple connection of ophthalmic mounting whereby the desired strength of the assembled parts will not be reduced in the introduction of means for compensating for wear and possible looseness and play resulting from said wear during the life of the mounting.

Another object is to provide novel means and method for compensating for wear of the parts of the temple connection of an ophthalmic mounting whereby the means for compensating for said wear and for eliminating looseness and play through the maintaining of the constant friction binding at the friction connection of the temple will be carried as an integral part of the assembly whereby the said means will not become displaced and lost through the interchanging of temples and the like.

Other objects and advantages of the invention will become apparent from the following description taken in connection with the accompanying drawing and it will be apparent that many changes may be made in the details of construction, arrangement of parts and steps of the methods shown and described without departing from the spirit of the invention as expressed in the accompanying claims. I, therefore, do not wish to be limited to the exact details of construction, arrangement of parts and steps of the methods shown and described, as the preferred forms only have been given by way of illustration.

The problem involved in the present invention is the provision of means for maintaining a desirable frictional pivotal connection between the temple and temple supports of an ophthalmic mounting. Difficulty has been encountered, in the past during continued use of the mounting, in having the engaging surfaces at the pivotal connection of the temple and temple supports become worn whereby an undesirable looseness and play existed which not only resulted in free swinging of the temple members but also permitted the undesirable tilting of the lens supports when on the face.

The problem of avoiding free swinging of the temple members of an ophthalmic mounting is a familiar one to those engaged in the manufacture of such mountings, and has long engaged the attention of designers in that industry. It is only through use that the excellence of the hinge or joint is determined since a hinge connection which is satisfactory when the mounting leaves the factory may swing more and more freely the longer the mounting is used. This is due primarily to wear which takes place at the temple connections so that the frictional engagement between the relatively movable surfaces in the hinge or pivot does not remain constant.

One of the difficulties lies in the character of the metal forming these surfaces and the difficulty is partially overcome in the present instance, by arranging different metals in surface contact with each other and through the introduction of a resilient action for urging the surfaces of said different metals constantly into engagement with each other.

It is desirable that the temples have a smooth swinging action during use and this is accomplished by the fitter who adjusts the tightness of the hinge connection. It has been found that when the contacting surfaces are formed of similar metals and the friction action for retaining the parts of the pivotal connection is introduced in these contacting surfaces there is a danger of having the surfaces become loosened so that frictionally it is impossible for the fitter to adjust the hinge or joint connected sufficiently tight to introduce the proper frictional action without danger of its becoming "frozen" or binding so tightly as to interfere with the desired swinging of the temple. It has been found that if different metals are employed, that is, steel in contact with a softer metal or alloy, such as copper, bronze, German silver, or other metal or alloy suitable for use in ophthalmic mountings, the wear between these contacting surfaces is of such a character that even though the joint is so constructed and adjusted for use that there is no objectionable binding, long continued use does not cause objectionable looseness of swing of the temples. It is believed that this is due to a tendency on the part of the harder surface to burnish the softer surface giving a smooth bearing and looseness is eliminated through the constant take up of the resilient action of the harder metal part.

In forming pivotal connections for the temples of an ophthamic mounting with the temple supports, in order to obtain sufficient bearing surface so as to provide a durable construction, it is the usual practice to provide one of the parts with a bifurcated end and the other with a tongue fitting within said bifurcation. In forming such connections care must be taken that the tongue is of sufficient thickness and rigidity to maintain the temple in desired extended position during use, that is, to prevent its becoming bent at the pivotal connection and displaced. Many attempts have been made to provide a construction embodying resilient friction means at the temple connections but in most prior art instances such friction binding means were introduced at the sacrifice of this desirable thickness of tongue so that the durability of the connection resulted from this procedure. The gist of the present invention therefore is to provide an arrangement whereby the desired rigidity and durability of parts is maintained and friction bearing means is provided for compensating for the wear of the parts and for maintaining a desirable frictional action at the pivotal connection during the use of the mounting whereby defects, such as drop temples, undesirable tilting of lenses and so forth commonly known in the art will be eliminated. While a number of different metals are available for forming the friction binding means, metals of the type sold under the trade name "Inconel," "Stainless Steel" and other non-corroding metals or alloys capable of taking a temper are preferable.

Referring to the drawing:

Fig. I is a front elevation of an ophthalmic mounting embodying the invention;

Fig. II is a top plan view of the mounting illustrated in Fig. I;

Fig. III is a fragmentary enlarged plan view of the temple hinge connection and temple support;

Fig. IV is a fragmentary inner side view of the temple and temple support, illustrated in Fig. III, showing the parts disunited;

Fig. V is a greatly enlarged fragmentary perpective view of the temple support illustrated in Fig. IV;

Fig. VI is a perspective view of the friction binding means;

Fig. VII is an enlarged perspective view of a modified form of the invention;

Fig. VIII is a perspective view of another modification;

Fig. IX is a view similar to Fig. VIII of a further modification;

Fig. X is a fragmentary plan view of the temple support illustrating another modified form of friction binding means; and Fig. XI is an enlarged perspective view of the friction binding means illustrated in Fig. X.

Referring more particularly to the drawing wherein like characters of reference designate like parts throughout the several views the mounting to which the device embodying the invention is applied comprises a pair of lenses 1 connected to a bridge member 2 by suitable lens straps or the like 3. The temple supports, in this particular instance, comprise relatively long and slender bar-like members 4 shaped to follow the upper contour edges of the lenses, as illustrated in Fig. I. The temple supports are secured, as illustrated at 5, adjacent the lens holding means 3 and extend outwardly about the upper contour edges of the lenses in the rear thereof and terminate in rearwardly extending temple supporting ends 6. The temples 7 are pivotally attached to the temple supports 6, as illustrated at 8. The temple supporting end 6, in this particular instance as illustrated in Fig. V, is provided with a perforated tongue 9 shaped to fit within a bifurcated end 10 formed on the temple 7. This tongue 9 fits between the bifurcated portions 10 of the temple and is pivotally secured thereto by a screw or the like 11. The tongue 9 and bifurcated end 10 are formed of precious metal or of a base metal having a precious metal plating or coating thereon and are of the relatively soft metal type.

As shown in Figs. II to VI inclusive a friction bearing member 12 having a tongue 13 thereon is secured to the temple support 6 as by soldering or welding the tongue 13 to the material of the temple support 6. The said friction bearing member 12 is preferably formed of a relatively hard metal such as inconel, stainless steel or other non-corroding metal or alloys capable of taking a temper and is provided with spaced resilient branches 14 which, when the said friction bearing member 12 is in secured relation with the temple support, is adapted to straddle the tongue 9. The branches 14 are so formed as to lie in a single plane, as illustrated by the dash lines 15 in Fig. III and by the full lines 15' in Fig. V. When the bifurcated end 10 of the temple 7 is being secured to the temple support 6 the side surfaces 16 which are formed circular in contour and substantially concentric with the center of the pivot connection of the temple with the temple support 6, are adapted to be pressed against the spaced branches 14 to cause them to exert pressure thereon and cause the said branches to assume the curved shaped of suitable curved seats 17 formed on the opposed sides of the tongue 9. The seats 17 are of a curvature which is substantially concentric with the axis of the pivotal connection of the temple with the temple support 6 and are spaced from the contour edge 16 of the bifurcated end 10 of the temple an amount sufficient to permit the bifurcated end to be pivotally connected with the tongue 9 by the screw or the like 11. When in this relation, the tendency of the branches 14 to return to their initial set in a single plane, as illustrated at 15, will constantly exert a side friction pressure on the circular contour edges 16 of the bifurcated end 10. When the temple 7 is swung about the pivot connection 8 the spaced branches 14 will exert a smooth friction bearing on the contour edge 16 and thereby eliminate any looseness and play in the temple pivotal connection and will also retain the temple in any adjusted position relative to the temple support during the use of the mounting. When the temple 7 is swung about its pivotal connection with the temple support 6 there will be a smooth functioning friction action introduced by the resilient branches 14 with the tendency of said branches to return to their initial set and thereby automatically functioning to take up any looseness and play which might be introduced by wear of the parts during use of the mounting. Because of the fact that the material of the friction member is of a harder metal than the metal of the bifurcated end 10, the edges 16 of said bifurcated end will tend to become burnished and have a smooth bearing surface with said resilient branches 14 whereby a relatively constant friction pressure will exist substantially throughout the entire area of engagement of the branches 14 with the contour edges 16 of the bifurcated end 10 when the temple 7 is moved about its pivotal connection 8 with the temple support 6. It is to be understood that although the friction bearing member is shown and described as being attached to the temple support, the said temple support might be provided with a bifurcated end simulating the bifurcated end 10 and the temple provided with a tongue simulating the tongue 9 in which instance the friction bearing member would be attached to the temple and would function in a manner similar to when it is attached to the temple support.

In Fig. VII there is illustrated another modification wherein a friction bearing member similar to the bearing member illustrated in Fig. VI has a base 25 attached to the set back face 26 of the temple. The said base is provided with spaced resilient branches 27 which are adapted to overlie the edge surfaces of the bifurcated end 10 of the temple. The base 25 is attached to the temple as by soldering, welding or the like.

In Fig. VIII there is illustrated a modified form of friction bearing member. The bearing member, in this instance, is provided with a tongue 18 which is to be secured to the temple 7 or temple support 6 by soldering, welding or the like. In this instance, the friction bearing member has spaced resilient bearing portions 19 joined adjacent the ends thereof opposite the tongue 18 by a web 20. This web is adapted to engage the surface 21 of the set back of the temple, as illustrated by the dash lines 22. The spaced bearing portions 19 are adapted to engage the contour edge 16 of the temple and are adapted to straddle the tongue 9 of the temple support when the parts are in assembled relation with each other. The portions 19 normally lie in a single plane and when the temple is attached to the temple support are adapted to be wrapped around the edge surfaces 16 of the bifurcated end of the temple, as illustrated by the dash lines. The tendency of the portions 19 to return to their initial set is adapted to maintain resilient frictional bearing action between the temple and temple support. The web 20 is adapted to hold the bearing portions 19 in desired spaced relation with each other. It is to be understood that instead of soldering or welding the tongues 13 and 18, as the case may be, to the temple or temple supports the said tongues may be attached to the temple or temple supports by a rivet, screw or the like.

In Fig. IX there is illustrated a further modification wherein a blade spring 23 is secured to the temple 7 as by soldering or welding the end 24 of said blade spring or by securing said end 24 to the temple by any suitable attaching means. The blade spring 23 is adapted to extend between the bifurcated portions of the end of the temple and is adapted to have a side surface bearing action with the tongue 9 of the said temple support when the parts are in assembled relation with each other.

In Figs. X and XI there is illustrated a further modification of the invention which comprises a separate friction bearing member 28 in the form of a blade spring having a slotted opening 29 therein and deflected end portions 30 and 31. The slot 29 provides means whereby the friction bearing member 28 may be placed over the tongue 9, as illustrated in Fig. X, with the deflected ends 30 and 31 respectively, in shape to engage the adjacent portions of the temple support 6 wherein a temple 7 is attached to said temple support. The central portion of the friction bearing member 28 normally lies substantially in a single plane, as illustrated in Fig. X, but is adapted to be cupped to substantially fit a surface 32 which is concentric with the pivotal axis of the temple connection with the temple support. When a temple 7 is assembled with the temple support 6 the friction bearing member 28 is adapted to be pressed inwardly to the shape of the surface 32.

It is to be understood that all of the friction bearing members are preferably formed of a relatively hard resilient material and are all arranged so as to have an edge surface bearing with the contour edges 16 of the bifurcated end 10 of the temple or with the contour edge of the tongue 9 of the temple support 6.

Although the device shown applies to a semi-rimless type mounting it is to be understood that the friction bearing members set forth herein may be applied to any of the commerically known type temple and temple supports.

Although the friction bearing member, illustrated in Figs. X and XI, is described as being loosely supported on the temple support 6, it is to be understood that one of the ends, either 30 or 31, may be attached to the temple support as by soldering, welding or the like.

From the foregoing description it will be seen that simple and economical means and methods have been provided for accomplishing all of the objects and advantages of the invention.

Having described my invention, I claim:

1. In an ophthalmic mounting, in combination, a temple member pivoted to a temple supporting member, with one of said members having a curved backing portion and the other having a similarly curved guide portion and both of said portions being spaced from said pivot, said curved portions lying closely adjacent each other and being adapted to move relative to each other when said members are moved about said pivot, and a ribbon-like resilient member, normally of a contour different from that of said curved portions, deformed from said normal contour to substantially the curvature of said portions and interposed between said curved portions so as to have surface to surface contact with both of said curved portions substantially throughout said interposition while retaining its resiliency, so that the tendency of said resilient member to return to its normal contour causes a constant frictional binding relation to exist between said members and said pivot in a direction transversely of said pivot.

2. In an ophthalmic mounting, in combination, a temple member pivoted to a temple supporting member, with one of said members having a curved backing portion and the other having a similarly curved guide portion and both of said portions being spaced substantially equidistant from said pivot, said curved portions lying closely adjacent each other and being adapted to move relative to each other when said members are moved about said pivot, and a ribbon-like resilient member, of a hardness different from that of said members and normally of a contour different from that of said portions, deformed from said normal contour to substantially the constant curvature of said portions and interposed between said portions so as to have surface to surface contact with both substantially throughout said interposition while retaining its resiliency, so that the tendency of said resilient member to return to its normal contour causes a constant frictional binding relation to exist between said members and said pivot in a direction transversely of said pivot, said hardness difference being such as to cause a burnishing action to take place upon the relative movement of the temple member with respect to the temple supporting member.

3. In an ophthalmic mounting, in combination, a temple member pivoted to a temple supporting member, with one of said members having a forked end with a curved bearing portion and the other having a similarly curved bearing portion and both of said portions being constantly spaced substantially equidistant from said pivot, said curved portions lying closely adjacent each other and being adapted to move relative to each other when said members are moved about said pivot, and a ribbon-like resilient member having a separate portion overlying each of the forks of said forked end and being of a hardness different from that of said members and normally of a contour different from that of said portions, deformed from said normal contour to substantially the curvature of said portions and interposed between said portions so as to have surface to surface contact with both substantially throughout said interposition while retaining its resiliency, so that the tendency of said resilient member to return to its normal contour causes a constant frictional binding relation to exist between said members and said pivot in a direction transversely of said pivot, said hardness difference being such as to cause a burnishing action to take place upon the relative movement of the temple member with respect to the temple supporting member.

4. In an ophthalmic mounting, the combination of a temple support and a temple pivotally connected with said support, said support and temple having adjacent curved bearing surfaces of substantially similar contour configuration and both of said bearing surfaces being spaced from the pivotal connection, and resilient means anchored between said temple support and temple and having the portion thereof located between said bearing surfaces normally substantially flat and adapted to assume the curved configuration of said bearing surfaces when in an assembled position, whereby said portion maintains a biasing action between said bearing surfaces at different positions of adjustment of the temple relative to said temple support.

5. In an ophthalmic mounting the combination of a temple support having a concave bearing surface thereon, a temple pivotally connected to said support and having a convex bearing surface complemental to said concave bearing surface of the temple support, both of said bearing surfaces being spaced from the pivotal connection, the bearing surface of said temple support and said temple being spaced from one another a sufficient distance to permit a normally flat resilient member to be interposed therebetween, a normally flat resilient member located in said space between said concave and said convex bearing surfaces and substantially assuming the arc of the complemental bearing surfaces, and limiting means on said resilient member to retain same in fixed relation with the temple and its support when said temple and support are pivotally connected.

6. In an ophthalmic mounting the combination of a temple support having a concave bearing surface thereon, a temple pivotally connected to said support and having a convex bearing surface complemental to said concave bearing surface of the temple support, both of said bearing surfaces being spaced from the pivotal connection, the bearing surface of said temple support and said temple being substantially constantly spaced equidistant from one another a sufficient distance to permit a normally flat resilient member to be interposed therebetween, a normally flat resilient member located in said space between said concave and said convex bearing surfaces and substantially assuming the arc of the complemental bearing surfaces, and anchoring means for said resilient member to retain same in substantially fixed relation with the temple and its support when said temple and support are in pivotal engagement with each other.

ELMER L. SCHUMACHER.